United States Patent [19]
Raziano

[11] Patent Number: 5,810,314
[45] Date of Patent: Sep. 22, 1998

[54] SUPPORT APPARATUS MOUNTABLE ON A VIEWING MONITOR

[75] Inventor: Michael Scott Raziano, Kenner, La.

[73] Assignee: Wonder Shelf, Inc., Kenner, La.

[21] Appl. No.: 400,594

[22] Filed: Mar. 8, 1995

[51] Int. Cl.⁶ .................................................. A47G 29/00
[52] U.S. Cl. ...................... 248/371; 248/188.2; 248/918
[58] Field of Search ................... 248/148, 371, 248/163.1, 172, 237, 188.2, 442.2, 918

[56] References Cited

U.S. PATENT DOCUMENTS

| | | | |
|---|---|---|---|
| 3,595,513 | 7/1971 | Rehlaender | 248/346 |
| 3,930,701 | 1/1976 | Otakie | 312/244 |
| 4,962,906 | 10/1990 | Fatool et al. | 248/148 |
| 4,966,342 | 10/1990 | Noguera | 248/172 |
| 5,039,044 | 8/1991 | Sher | 248/176 |
| 5,040,760 | 8/1991 | Singer | 248/918 X |
| 5,042,761 | 8/1991 | McBride et al. | 248/175 |
| 5,249,397 | 10/1993 | Monaco | 52/126.1 |
| 5,322,255 | 6/1994 | Garrett | 248/918 X |

*Primary Examiner*—Derek J. Berger
*Attorney, Agent, or Firm*—Pravel, Hewitt, Kimball & Krieger

[57] ABSTRACT

A support bracket supportable on the upper surface of a television monitor or computer monitor which includes a pair of parallel support arms, the first ends of the arms supported on the forward edge of the monitor surface, and extending rearward to a second end. The arms would be held in spaced apart relation with a transverse support arm, secured to each principal support arms; further is included a pair of rear leg members, extending between the second end of the arms and having lower ends resting on the rear of the upper surface of the monitor; the rear leg members having the ability to be height adjustable so that when the lower ends of the leg members are resting on the rear of the monitor the principal support arms are in a horizontal position in order to support the VCR or other item in a horizontal position on the monitor.

12 Claims, 2 Drawing Sheets

SUPPORT APPARATUS MOUNTABLE ON A VIEWING MONITOR

BACKGROUND OF THE INVENTION

1. Field of the Invention

The present invention relates to an apparatus for supporting components thereon. More particularly, the present invention relates to a support bracket apparatus which is mountable on a viewing monitor for supporting electronic accessory devices or other things.

2. General Background

In the field of electronic components, there are various types of components which are utilized as part of an overall system. For example, there have developed "entertainment centers" which have evolved, particularly for home use, which allow the various electronic components, (e.g., television monitors, VCR units, audio equipment and related speakers) to be housed within a single unit. In most of these types of entertainment centers, it is important that the VCR is positioned so that it can be electronically linked to the television monitor for use. However, oftentimes, the expense of entertainment centers are such, that they are out of the reach of the budget of families, and therefore, makeshift arrangements have to be made.

One problem confronted in the effort to construct a common area for electronic components without having to purchase an expensive entertainment center is the location of the VCR in relation to the television monitor. Because of the physical design of a television monitor, VCR units cannot simply be placed on the top surface of the monitor, since it would slide off.

Therefore, there is a need to address a means for positioning a VCR unit on the top surface of a television monitor. Also, it is important that the device be inexpensive and have the ability to accommodate all types of monitors, while having the flexibility to support all types and sizes of VCRs and other types of items one may wish to place on top of a television monitor.

There are assemblies which have been patented in the art which have been identified as pertinent art and are included herewith in the accompanying prior art statement.

SUMMARY OF THE PRESENT INVENTION

The apparatus of the present invention solves the problems in the art in a simple and straightforward manner. What is provided is a support apparatus supportable on the upper surface of a television monitor or computer monitor which includes a pair of principal parallel support arms, the first ends of the arms supported on the forward edge of the monitor surface, and extending rearward to a second end. The arms would be held in spaced apart relation with a transverse support arm, secured to each principal support arms. There is further included a pair of rear leg members, extending between the second end of the arms and having lower ends resting on the rear of the upper surface of the monitor; the rear leg members having the ability to be height adjustable so that when the lower ends of the leg members are resting on the rear of the monitor so that the principal support arms are in a horizontal position in order to support the VCR or other item in a level position on the monitor.

Therefore, it is a principal object of the present invention to provide a support apparatus for items, such as VCR units, to be placed on the top surface of a monitor, in order to support the items on the monitor.

It is a further principal object of the present invention to provide a support apparatus for components such as VCR units and other electronic accessory apparatuses, which includes vertically adjustable support members in order to adjust to the various cabinet configurations of television or computer monitors;

It is a further object of the present invention to provide a support apparatus which is height adjustable depending on the type of monitor upon which the apparatus rests to allow the support arms to be adjusted in a horizontal fashion for level support.

It is a further object of the present invention to provide a support apparatus mountable on a television or computer monitor for supporting various widths and depths of VCRs or other types of electronic equipment thereupon;

It is a further object of the present invention to provide a support apparatus mountable on a television or computer monitor which is simple in construction and allows for flexibility in the types of items or electronic equipment supported thereon.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
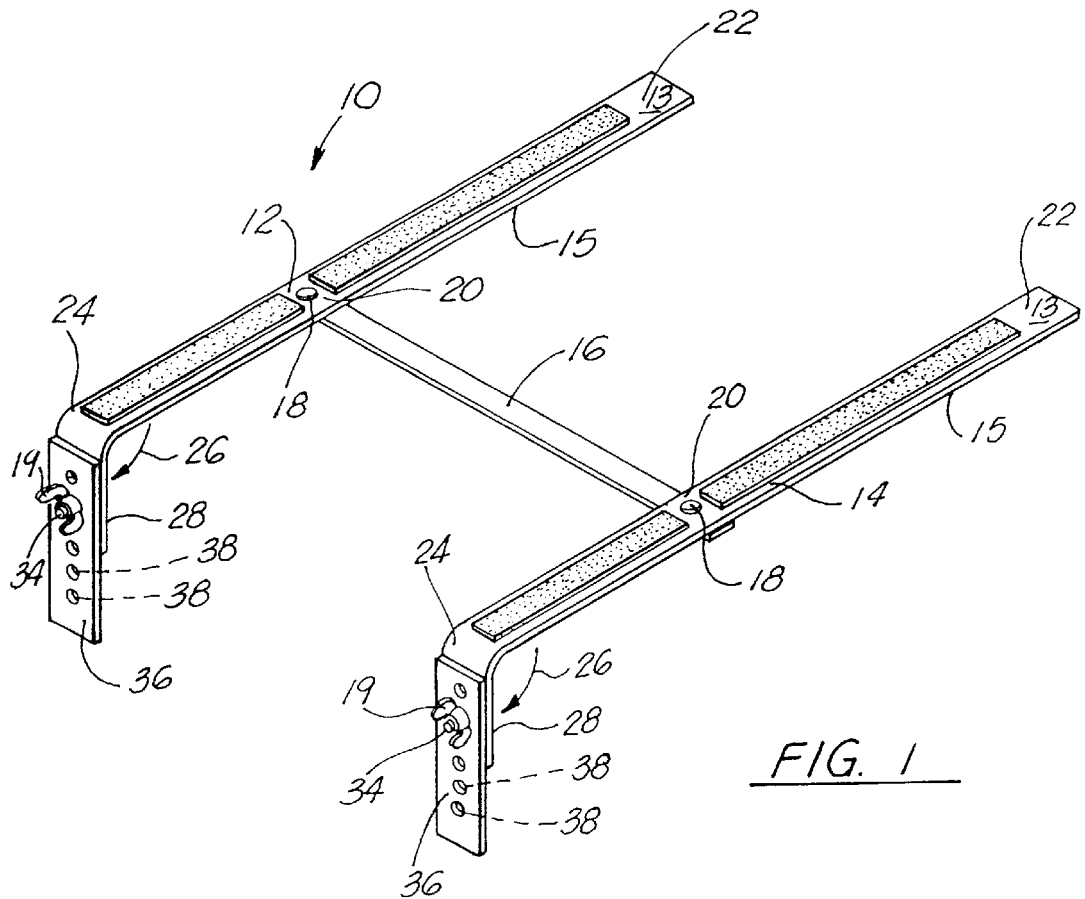
FIG. 1 is an overall perspective view of the preferred embodiment of the apparatus of the present invention.

FIGS. 1 through 4 illustrate the preferred embodiment of the present invention referenced by the numeral 10. As illustrated, particularly in FIG. 1, apparatus 10 comprises a pair of principal frame members 12, 14, maintained in spaced apart relation by a transverse bar member 16, with ends of transverse bar member 16, by screws 18 and wing nuts 19, at substantially midpoint 20 of the length of each arm member 12, 14. As illustrated further, each arm member 12, 14 include a first end 22, and a second rear point 24. At each rear point 24, there is provided a substantially 90 degree bend (arrow 26), with a vertical leg member 28, extending downward to rear end 30. Each vertical leg member 28 includes a port 32, through which a screw 34 is positioned to engage a vertical extension member 36 with a wing nut 35. Each vertical extension member 36 includes a plurality of ports 38 for allowing the extension of each vertical leg 28 for the reasons to be explained further. As further illustrated in FIG. 1, the support frame 10 is generally made of flat metal, such as a lightweight aluminum. Therefore, each support arm 12, 14 provides an upper support surface 13 and a lower surface 15, the forward end 22 of which rests on a forward upper surface 40 of a terminal 42 during use. The upper support surface 13 would include a layer of foam padding 17, substantially along its length, so that when an item, such as a VCR 44 (FIG. 2) is placed thereupon, there is defined a space between the VCR 44 and the support arms 12, 14.

Figure 2:
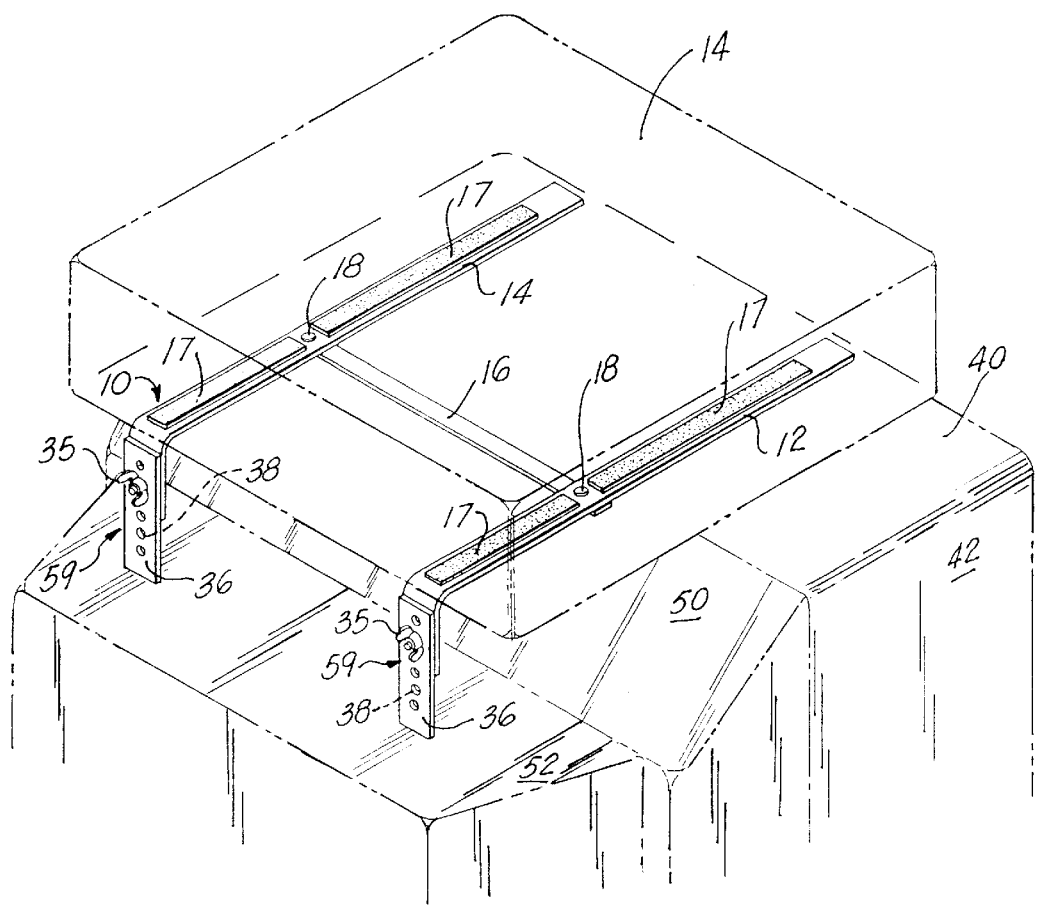
FIG. 2 illustrates a side view of the preferred embodiment of the apparatus of the present invention positioned upon a viewing monitor, supporting an electronic component, such as a VCR, thereon.
Figure 3:
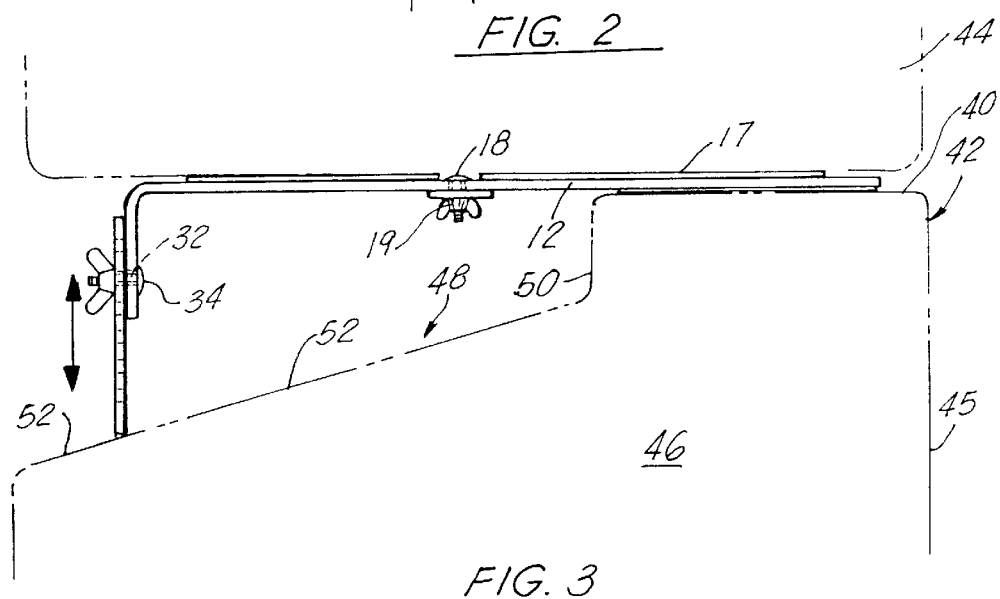
FIG. 3 illustrates an overall perspective of the preferred embodiment of the apparatus of the present invention positioned upon a viewing monitor and supporting an electronic component, such as a VCR, thereon.

FIGS. 2 and 3 illustrate the primary use of the support frame apparatus 10. As illustrated in the FIGURES, the apparatus has been placed upon a viewing monitor 42. The viewing monitor 42 would be of the type having a viewing screen 45, and internal electronic components housed within a generally rectangular housing 46. In the particular monitor 42 illustrated, the upper surface 48 of monitor 42, has a first forward upper surface 40, which then slants downward along sloping surface 50 to a second rear lower level 52.

In the preferred embodiment of the apparatus 10, the forward ends 22 of each support arm 12, 14 would rest on the forward upper surface 40, with the arms 12, 14 extending rearward. To assure that the forward ends 22 of each arm 12, 14 is set firmly upon the upper surface 40 of monitor 42, there is provided a sticky material, such as a tape 54, on the underside of each arm 12, 14, which would make contact with the upper surface 40 of monitor 42, as seen in FIG. 3.

Because the rear portion 52 of upper surface 48 of monitor 42 is lower than the forward upper surface 40, the apparatus must include a means to allow the support arms 12, 14 to be maintained along a horizontal plane 56 so that an item, such as a VCR 44 (shown in phantom view) can be supported level thereon, to avoid it sliding from the support surface 13 of each arm 12, 14. This includes a height adjustment means 59, comprises adjustable leg members 58, in combination with vertical extension portion 60 of arms 12, as illustrated in FIGS. 2 and 3. The vertical extension portion 60 of arms 12, 14 have been lowered to the point so that the lower end 62 of each extension portion 60 rests on the rear lower surface 52 of monitor 42. Because of the height adjustability of the support apparatus 10 with the extension members 60, the apparatus is maintained level, although clearly the first forward ends 22 and the rear point 24 are on a level horizontal plane. As illustrated, should the apparatus be utilized with a differently designed monitor 42, with less or greater slope, the height adjustment means 59 of the apparatus 10 will always provide for the leveling of the apparatus before it is utilized to support, for example, a VCR 44, as illustrated in FIGS. 2 and 3.

Figure 4:
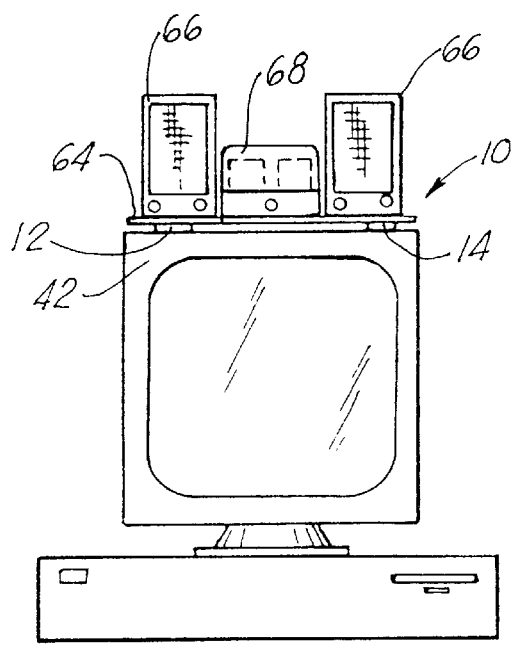
FIG. 4 illustrates a frontal view of the preferred embodiment of the apparatus of the present invention positioned upon a viewing monitor and supporting components thereon.

FIG. 4 illustrates in frontal view the apparatus 10 utilized as a support apparatus for other items, other than a VCR as seen in FIGS. 2 and 3. As seen in FIG. 4, apparatus 10 is positioned on a monitor 42. However, a shelf member 64 has been laid across the support surfaces 13 of each arm member 12, 14, which then may accommodate, as illustrated, a pair of speakers 66, and perhaps a radio 68. It is important to note, that as illustrated in FIGS. 2 through 4, because the support apparatus 10 comprises a flat support surface for components, and includes no limiting vertical sidewalls, as is found in some of the prior art, the support arms are able to support components, and a shelf, which may greatly overlap the width and depth of the apparatus 10. However, because of the support features of the apparatus, if the component which overlaps it, is positioned centrally on the apparatus, as for example the VCR as seen in FIG. 2, then the apparatus is able to support it easily. Additionally, because of the thin, flat support frame 10, which may be constructed of lightweight metal, such as aluminum, or a high strength plastic, it is virtually unnoticeable; thus, creating an attractive support area between the monitor 42 and the supported item.

The following table lists the part numbers and part descriptions as used herein and in the drawings attached hereto.

| PARTS LIST | |
|---|---|
| Description | Part No. |
| support apparatus | 10 |
| support arms | 12, 14 |
| upper support surface | 13 |
| lower surface | 15 |
| transverse bar member | 16 |
| foam padding | 17 |
| screws | 18 |
| wing nuts | 19 |
| midpoint | 20 |
| first end | 22 |
| second rear point | 24 |
| bend | 26 |
| vertical leg member | 28 |
| rear end | 30 |
| port | 32 |
| screw | 34 |
| wing nut | 35 |
| vertical extension member | 36 |
| ports | 38 |
| upper support surface | 40 |
| terminal, viewing monitor | 42 |
| VCR | 44 |
| viewing screen | 45 |
| rectangular housing | 46 |
| upper surface | 48 |
| sloping surface | 50 |
| tape | 54 |
| extension member | 60 |
| height adjustment means | 59 |
| shelf member | 64 |
| speakers | 66 |
| radio | 68 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus in combination with a viewing monitor for supporting components on the viewing monitor, comprising:

a) the viewing monitor;

b) a pair of principal support arms, spaced apart in substantially parallel relation having front ends supported on a forward upper surface of the viewing monitor;

c) vertical leg members connectedly engaged to a rear end of the support arms; and d) means for allowing the vertical leg members to be height adjustable for maintaining the principal support arms horizontal while the component is supported thereon.

2. The apparatus in claim 1, further comprising a transverse member interconnected between the principal support arms and maintaining the support arms in spaced apart relation.

3. The apparatus in claim 1, further comprising a plurality of ports in each vertical leg member for accommodating a screw in the rear end of the support arms, for defining the means to adjust the height of the support legs.

4. The apparatus in claim 1, wherein the rear end of the support arms connected to the vertical leg members is vertically inclined to engage each vertical leg member.

5. The apparatus in claim 1, wherein the support arms further comprise a flat support surface to support a VCR thereupon.

6. The apparatus in claim 5, further comprising a transverse member interconnecting the principal support arms, maintaining the arms in spaced apart relation while supporting an item thereon.

7. The apparatus in claim 5, further comprising a plurality of ports in each rear leg member for accommodating the screw means in the rear end of the support arms, to allow the adjustment of the height of the support arms.

8. An apparatus in combination with a viewing monitor supportable on the viewing monitor, the apparatus comprising:
 a) the monitor;
 b) a principal support surface, including a flat upper support surface for supporting a VCR unit, thereupon;
 c) front ends of the support arms supported on an upper forward surface of the monitor in spaced apart relation, and extending rearwardly;
 d) a rear leg member connectedly engaged to a rear end of each of the support arms, and extending downwardly to rest on a rear portion of the upper surface of the monitor; and
 e) screw means for allowing the rear leg members to be height adjustable for supporting the VCR horizontally, while the front ends of the support arms rest on the forward edge of the monitor, and the rear leg members are supported on the rear portion of the monitor.

9. The apparatus in claim 8, wherein the principal support surface further comprises support arms spaced apart in substantially parallel relation for defining a flat support surface upon which the VCR rests while being supported thereon, allowing the VCR to overlap both the width and depth of the apparatus.

10. A support apparatus in combination with a viewing monitor, comprising:
 a) the viewing monitor, of the type having a viewing screen housed within an enclosure, and including a first portion of an upper surface of the monitor at a higher level than a second portion of the monitor;
 b) a support frame portion, supportable on the upper surface of the viewing monitor, the frame comprising:
   i) a pair of principal support arms, spaced apart in substantially parallel relation, and including a flat upper support surface for supporting an item thereupon;
   ii) front ends of the support arms supported on the first portion of the upper surface of the monitor in spaced apart relation, and extending rearwardly to the second portion of the upper surface of the monitor;
   iii) rear leg members connectedly engaged to a rear end of each of the support arms, and extending downward to rest on the rear portion of the upper surface of the monitor;
   iv) screw means for allowing the rear leg members to be height adjustable for supporting the item horizontally, while the front ends of the support arms rest on the first portion of the upper surface of the monitor, and the rear leg members are supported on the second rear portion of the upper surface of the monitor.

11. The apparatus in claim 10, wherein the upper surface of the monitor slopes rearward from the first forward portion of the monitor to the second rear portion of the monitor.

12. The apparatus in claim 10, wherein the support arms are connected to the support frame portion with screw members.

* * * * *